Feb. 19, 1935.  E. P. OSWALD  1,991,514
ARTIFICIAL REFRIGERATING APPARATUS
Filed Dec. 7, 1928  3 Sheets-Sheet 1

INVENTOR.
Earl P. Oswald.
BY
ATTORNEY.

Feb. 19, 1935. E. P. OSWALD 1,991,514
ARTIFICIAL REFRIGERATING APPARATUS
Filed Dec. 7, 1928 3 Sheets-Sheet 2
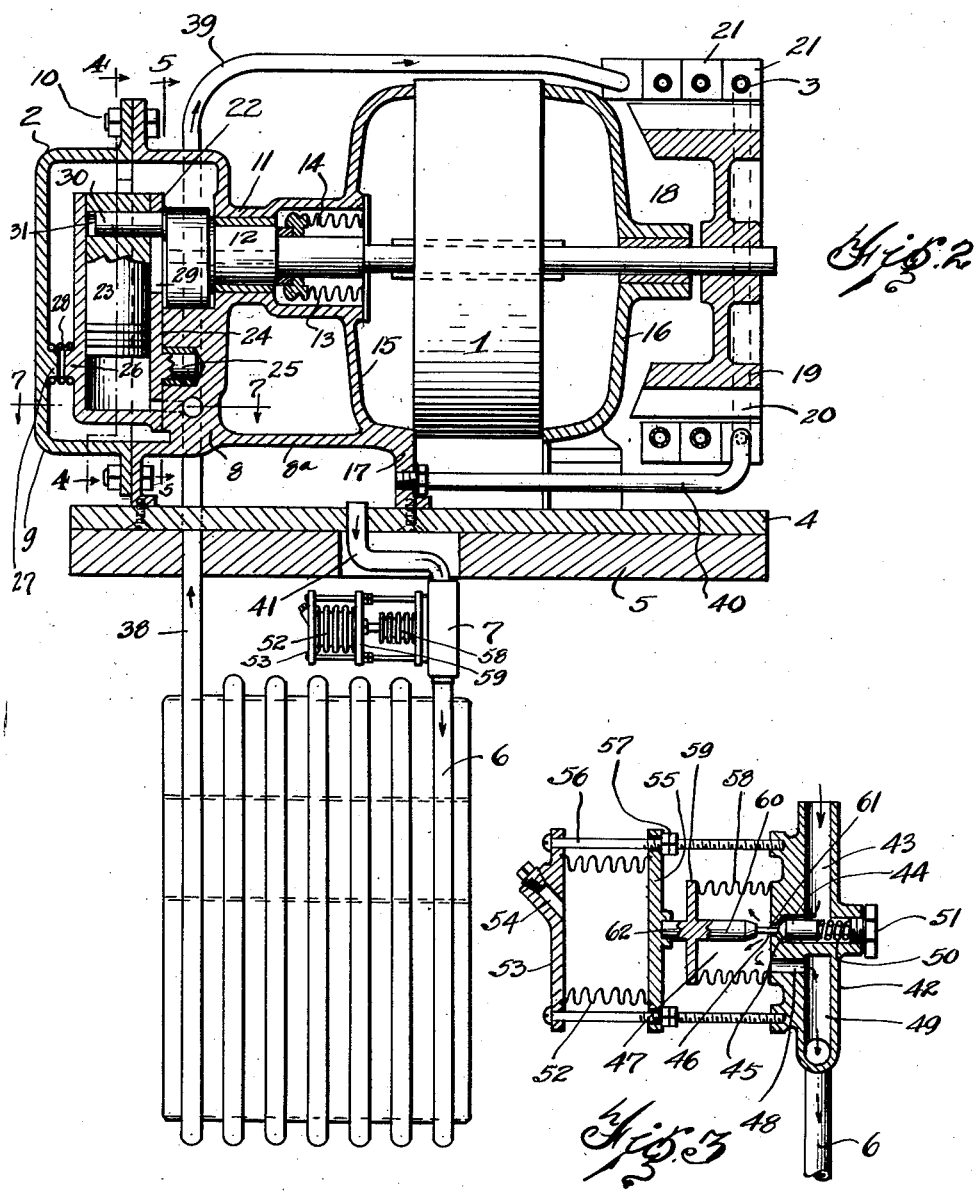
INVENTOR.
Earl P. Oswald
BY
ATTORNEY.

Feb. 19, 1935. E. P. OSWALD 1,991,514
ARTIFICIAL REFRIGERATING APPARATUS
Filed Dec. 7, 1928 3 Sheets-Sheet 3
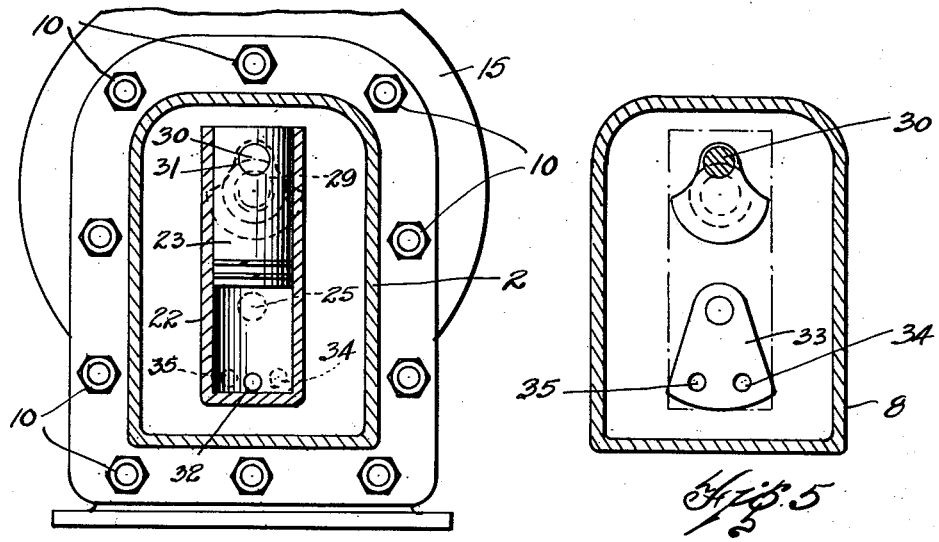
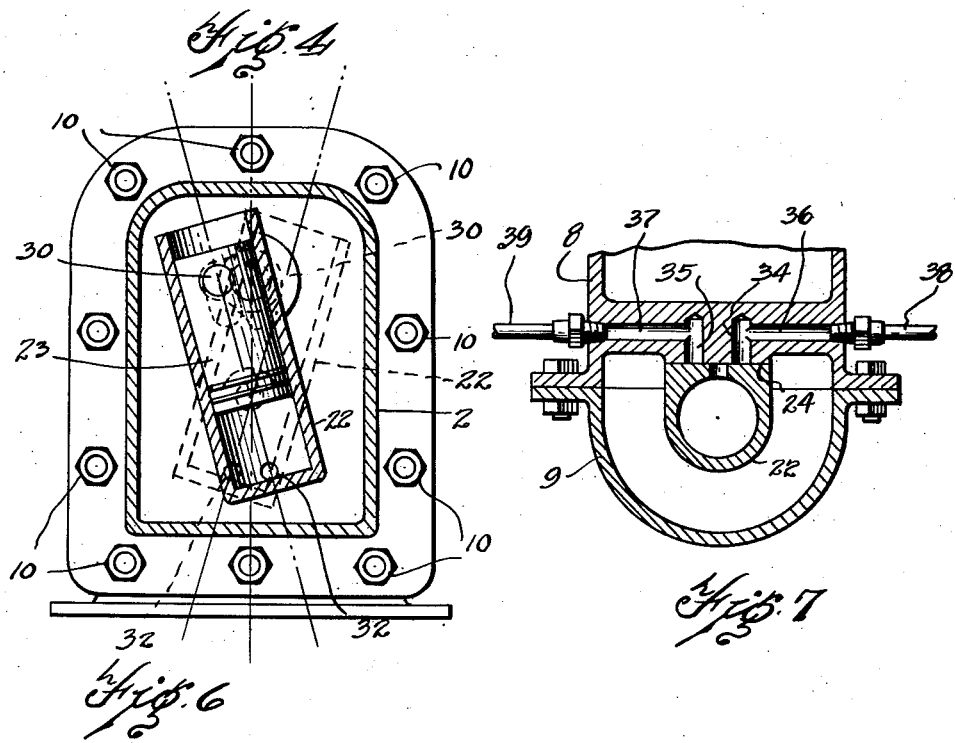
INVENTOR.
Earl P. Oswald
BY
ATTORNEY.

Patented Feb. 19, 1935

1,991,514

UNITED STATES PATENT OFFICE 1,991,514

ARTIFICIAL REFRIGERATING APPARATUS

Earl P. Oswald, Detroit, Mich., assignor of one-tenth to Charles E. Wisner, Detroit, Mich.

Application December 7, 1928, Serial No. 324,342

1 Claim. (Cl. 236—92)

This invention relates to artificial refrigerating apparatus and method of operating the same.

The principal object of the invention is to provide a device for maintaining the atmosphere of a compartment or a space at substantially constant temperature by passing a heat absorbing element therethrough by means of which units of heat are removed from the compartment and varying the volume of flow of the heat absorbing element per unit of time in such manner that the units of heat removed from the compartment are practically equal to the units of heat that may be absorbed by the atmosphere of the compartment. This principal object and feature of the invention may be accomplished with various types of apparatus only one form of which is herein shown.

The apparatus shown is of the compressor-condenser-expander type and an object of this form of the invention is to provide a very compact unit of less overall dimension than is usual with this type of apparatus and that may be readily connected with a refrigerator cabinet or removed therefrom as a unit without disturbing the operative parts of the apparatus.

A further object of the invention and the feature of the invention which to a major extent enables the unit to be made of an unusually small dimension in comparison to present day types of compressor-condenser-expander refrigerating units is in the construction of one of the elements of the unit whereby the system operates on a different plan than any type of refrigerating apparatus with which I am familiar and by means of which the principal object of the invention is attained.

In the previous compressor-condenser-expander systems the plan of operation after the system is once in operation is as follows—

As the atmosphere of the cabinet, which is to be controlled in temperature by the apparatus, increases in temperature to a predetermined point, previous apparatus of this type is started into operation by a thermostatic switch controlling the flow of current to the motor which in such systems is usually an ordinary electric motor. Once started the system continues to operate until the temperature has decreased to a predetermined degree whereupon the thermostatic switch operates to break the circuit to the motor and the apparatus then remains idle until the temperature of the refrigerated compartment again rises to such point as to operate the switch. One fault in operation of such a system by this method arises in the following manner—

In such previous compressor-condenser-expander types of apparatus, an expansion valve is located between the high and the low pressure sides of the system, this valve being set to operate at a predetermined position and when the system ceases operation by reason of the drop in temperature of the compartment to its low predetermined point, the expansion valve closes.

During the idle period the pressure of the low pressure side increases by reason of absorption of heat and, when the temperature of the atmosphere in the refrigerated compartment has increased to a degree sufficient to close the circuit to the motor and the apparatus starts operation, the first work performed by the compressor does not result in any refrigerating effect as its first work is to reduce the pressure in the low pressure side by removal of refrigerant transferring the same to the high pressure side and this continues until the pressures of the high and low sides respectively approach their normal difference in pressure whereupon the expansion valve opens and the normal refrigerating effect is produced by the transfer of refrigerant from the high to the low pressure side.

In this older method of operation of this type of refrigerating system, the apparatus is operated usually about twenty minutes of each hour and is idle for about forty minutes of each hour and approximately half the period of time of operation is utilized in removal of excess pressure of the low pressure side which is a waste of current in that no immediate refrigerating effect is produced by operation of the system up to the time there is sufficient difference in pressure between the low and high sides of the system to permit or cause the expansion valve to open. Further, in such previous methods of operation an excess amount of current is used in the frequent starting of the motor and apparatus into operation which entails a further loss of current.

My invention seeks to eliminate such waste of current and consists in continuously operating the system and varying the refrigerated effect produced by the continuous operation in accordance with the variation in temperature of the compartment to be refrigerated. I have found that the consumption of current under this plan of operation, although the apparatus is operated continuously and previous apparatus operated about eight hours in each twenty-four hour period, is less than with such previous apparatus as is hereinafter more fully pointed out.

A further aim and object of the invention is secured by this method of operation. Previous refrigerating apparatus of this type requires that the temperature of the box or refrigerated compartment shall increase to a certain degree before the apparatus will operate but my invention provides a means for maintaining the refrigerating compartment at substantially constant temperature, as for instance forty degrees F., and I accomplish this feature by the continuous operation of the system and varying the amount of refrigerant passed from the high to the low pressure side through or by reason of variation in temperature in the refrigerated space. This is accomplished by the use of an expansion valve which is within the refrigerated space and temperature controlled in form so that in operation, after the apparatus has first been operated to reduce the temperature of the space to be refrigerated to a predetermined degree, the amount of refrigerant passed from the high to the low pressure side will be that amount per unit of time required to maintain the refrigerated space at predetermined temperature.

If, by reason of change in outside or exterior temperature or other cause the refrigerated space tends to increase in temperature, the expansion valve will be opened to a greater degree depending upon the temperature change or, if the temperature exteriorly of the box decreases and for this or other reason reduces the heat leakage into the refrigerated space, the amount of refrigerant passing the expansion valve is reduced. Therefore an object of this invention is to provide a method of operation of an artificial refrigerating system of the compressor-condenser-expander type in which there is constant operation of the apparatus and the flow of refrigerant from the high to the low side so controlled that the refrigerating effect is in balance with the tendency of a refrigerated space to vary in temperature.

These and other various objects and novel features of the invention are hereinafter more fully described and claimed, and the preferred construction of artificial refrigerating apparatus embodying my invention is shown in the accompanying drawings in which—

Fig. 2 is an enlarged view partly in section showing my improved refrigerating apparatus.

Fig. 3 is an enlarged vertical section of the temperature controlled expansion valve in its preferred form.

Fig. 4 is a section of the compressor taken on line 4—4 of Fig. 2.

Fig. 5 is an enlarged section taken on line 5—5 of Fig. 2.

Fig. 6 is a view similar to Fig. 4 illustrating the movement of the compressor cylinder in operation.

Fig. 7 is an enlarged section taken on line 7—7 of Fig. 2.

Figure 1:
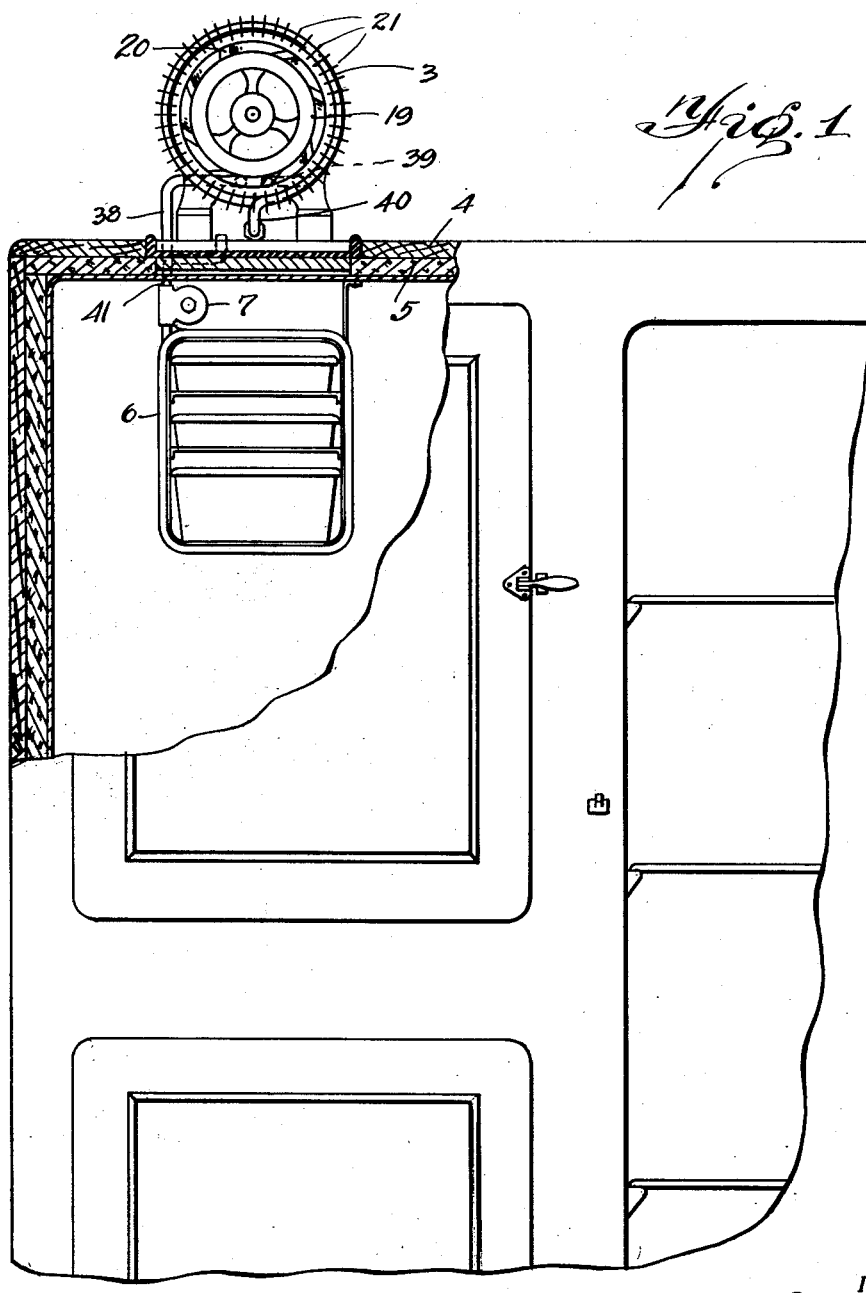
Fig. 1 is an elevation of part of a refrigerator cabinet with my improved apparatus associated therewith.

This type of refrigerating apparatus in its preferred form of construction is shown more clearly in Fig. 2 and it is firstly to be understood that the apparatus—that is, the motor, the compressor, the condenser, and the expansion coils and expansion valve are all assembled as a unit to be connected with or removed from a refrigerator cabinet in the form here shown. For this purpose it is necessary that the unit be very compact in form and light in weight in order to occupy as little space as possible and to enable its being more readily handled in assembly or disassembly with the cabinet. For this purpose I preferably arrange the motor 1, the compressor 2, and condenser 3 on one side of a plate 4 preferably provided with an insulating material on its lower surface as indicated at 5. On the opposite side of this plate and insulating member is the expansion coil 6 and the expansion valve indicated generally at 7 for controlling the flow of refrigerant from the condenser or high side of the circuit to the expander or low side. While this invention is not confined to a specific form of compressor I have shown a simple, inexpensive and compact type of compressor which comprises a housing, the base of which is indicated at 8, and a removable portion or cover is indicated at 9 connected with the base 8 by bolts 10 extending through flanges formed respectively on the base and cover portion.

The base 8 is provided with a bearing 11 for the drive shaft 12 and is formed with an enlarged portion 13 to receive a seal 14 preventing escape of any oil from the housing to atmosphere through the motor casing or shell indicated at 15 and which is formed integrally with the compressor base 8. This portion 15 and complemental portion 16 on the opposite side form a housing for the electric motor 1, the shaft of which is a continuation of the compressor shaft 12. The electric wiring for the motor is not here shown but may be the usual cord and plug for a pull socket commonly in household use with various electrical devices. The flange at the bottom of the base portion 8 of the compressor is attached to the plate 4 and the portion 15 of the casting forming a housing for the motor is also provided with foot portion 17 attached to the plate 4. The flange at the bottom of the base 8 and the flange 17 are sealed (as by means of the gasket) relative to the plate 4 and a web 8a extends from the base 8 to the motor shell 15 and is flanged on opposite sides corresponding to the flange 17 in sealed relation with the plate. Thus, a sealed chamber is provided to which refrigerant from the condenser is passed by the conduit 40 as is hereinafter shown. The motor shaft extends outwardly of the portion 16 through a bearing 18 provided thereon and on the outer end is mounted a fan 19 of any approved type here shown as being formed with radial blades 20. The condenser 3 is formed of several coils of pipe arranged circularly as will be understood from Fig. 1 in spaced relation with the fan blades as shown in Fig. 2 forming a shell exteriorly of the fan consisting of these tubes and fins 21 thereon to increase the cooling effect.

Rotation of the fan causes a flow of air about the condenser coils to dissipate the heat of the refrigerant contained therein.

The compressor is of the oscillating type shown in section in Fig. 2 and consists of a cylinder 22 and a piston 23 reciprocatable therein. The pump on the base side, as will be understood more clearly from Figs. 2 and 7, has a finished surface 24 lying in close engagement with a similar finished surface on the base 8 of the compressor housing. The cylinder also has a stud 25 supported in a bearing provided in this housing 8 pivotally supporting the cylinder on the housing. On the side of the cylinder opposite the stud 25 is provided a short hub 26 and a similar hub 27 is formed on the inner face of the cover 9. A coiled spring 28 is interposed in the space between the cylinder and cover around these studs the purpose of which is to hold the plane face 24 of the cylinder in tight contact with the complemental face provided on the base 8 of the compressor housing. The cylinder has a slot 29 extending parallel with the axis thereof as will be understood from Figs. 2 and 4. A crank pin 30 which is formed eccentrically to the axis of the shaft 12 extends through the slot 29 into an aperture 31 near the top of the piston and by revolution of the shaft and the eccentric causes the cylinder to oscillate on the pivot shaft 25 and also causes a reciprocation of the piston in the cylinder. As will be clearly seen from Fig. 4 the piston at its lower end is provided with an aperture 32 which opens through the plane face 24 of the cylinder block at its lower end.

As will be seen in Figs. 2 and 7 this plane face 24 of the cylinder engages the plane face 33 on the base portion of the compressor housing which is provided with two apertures 34 and 35 relative to which the aperture 32 of the cylinder comes to registration at the extreme point of its oscillation at each direction of its pivot stud 25. The arrangement of the parts is such that, as the aperture 32 of the cylinder comes to registration with the aperture 34, the piston starts on its upward or intake movement and, upon completion of this upward intake movement of the piston and the consequent oscillation of the cylinder upon its axis, the aperture 32 of the cylinder comes to registration with the aperture 35 in the base 8 and the downward or compression stroke of the piston takes place. There is thus provided a very simple compressor construction and operation and due to this compressor being directly connected with the motor shaft, which usually runs about 1700 revolutions per minute, it may be made of very small capacity and but very little refrigerant need to be taken from the expansion or low pressure side and transferred to the condenser or high pressure side of the refrigerant cycle at each stroke. This oscillatory movement of the cylinder is shown by the full and dotted lines in Fig. 6, the full lines being the position of a cylinder on the intake stroke and the dotted lines being the position thereof on the compression stroke of the piston. As is shown more clearly in Fig. 7 these apertures or recesses 34 and 35 are connected at their bottoms with other cross passageways 36 and 37 respectively, the discharge conduit 38 of that expansion being connected with the passageway 36 and the intake conduit 39 of the condenser core 3 being connected with the passageway 37 as shown in Fig. 2.

The condenser coils at the end farthest from the connection of the line 39 is provided with an outlet conduit 40 which discharges to the tank 90 and the conduit 41 connects the tank to the expansion valve 7 thus forming a complete circuit from the condenser to the expansion coils thence to the compressor and back to the condenser. The conduit 31, condenser 3, conduit 40, tank 90 and conduit 41 form the high pressure side of the system while the expander 6 and conduit 38 form the low pressure side.

The compressor is positioned in a hollow casing permitting the same to be practically completely immersed in oil for the purpose of lubrication at least to a point above the upper end of the cylinder. By this immersion in the lubricating fluid the piston is supplied with lubricant as well as the shaft bearing 11 and the seal 14 is provided to prevent leakage of lubricant or of refrigerant from this cylinder housing. The bearing 18 to the motor may be lubricated in the ordinary manner that is provided for motors of this class (not here shown).

The expansion valve 7 through which refrigerant is passed from the high pressure side to the expansion coil 6 consists of a base casting 42 shown clearly in Fig. 3. This casting is provided with a passageway 43 at the upper end to which the conduit 41 leading from the tank 90 discharges. In this base portion 42 is provided a valve 44 which is positioned in an aperture provided therefor and is movable toward or from its seat 45 as hereinafter stated.

As shown in Fig. 3, in this preferred form of expansion valve, the seat has a small aperture 46 through which fluid may pass from the passageway 43 to a chamber 47 formed by the bellows 58 and thence outwardly through an open passageway 48 in the base casting 42 to a passageway 49 extending in alignment with the inlet passageway 43. To this passageway 49 is connected the intake end of the expansion coil or expander 6.

A coiled spring 50 is provided back of the valve 44 in a recess or opening provided therefor closed by the flanged nut 51 which is preferably provided with a packing to prevent leakage at this point. The purpose of the spring is to insure movement of the valve toward its seat.

As previously stated, this expansion valve is a temperature controlled valve and, in the usual operation of the device, the valve is positioned relative to the seat by means of the bellows member 52. This bellows member 52 consists of an outer plate 53 provided with a plugged aperture 54 by which $SO^2$ or other readily vaporizable fluid is introduced. At the opposite end of the bellows is provided a plate 55, the bellows member 52 being sealed at its opposite ends to the respective plates 53 and 55.

The bellows member 52 is supported in position in axial alignment with the first bellows 58 by means of stud shafts 56 of which there are preferably four and at the threaded end these stud shafts are secured to the base 43 of the valve structure. Midway of the length of the valves is provided adjustable nuts and lock nuts indicated generally at 57 and the plate 55 is provided with comparatively large apertures permitting this plate to move on the rods through the expansion or contraction of the bellows 52 by temperature change. The first bellows 58 providing the chamber 47 is sealed to the base surrounding the valve port 46 at one end and to a plate 59 at the opposite end. This plate 59 is provided with an internally projecting stud portion 60 at the outer end of which is provided a pin like extension 61 normally extending through the valve port to contact with the valve but unattached thereto in the structure shown. On the outer face of the plate 59 is provided a stud 62 extending into a recess provided in the adjacent face of the plate 55 of the bellows 52.

The operation of this valve is extremely simple, its purpose being to vary the quantity of refrigerant per unit of time passing from the high to the low pressure sides of the circulating system in practically exact relation to variation in temperature in the refrigerated space so that the quantity of liquid being expanded and therefore producing a refrigerating effect exactly balances the tendency of the space to absorb heat from the exterior or from material placed in the said space.

To accomplish this result the valve 44 is varied in relation to its seat through and by reason of variation in temperature in the refrigerated space. In Fig. 3 the valve is shown in its full open position, the nuts 57 on the rod limiting the movement of the plate 55 by pressure due to the vaporization of the fluid in the bellows 52. Under this full open position of the valve the greatest permissible volume of fluid per unit of time is being passed to the expansion coil and thus the highest refrigerating effect is being produced under this condition but this condition is variable through adjustment of the nuts 57 so that the expansion valve may be set to pass practically any predetermined volume of fluid per unit of time up to the capacity of the port 46. Under this condition of high temperature in the refrigerated space with the parts positioned as shown in Fig. 3, the parts will maintain this position until a change of temperature occasioned by the expansion of the refrigerant begins to cause a tendency of the bellows 52 to contract and this will permit the bellows 58 to expand under pressure from the high pressure side and therefore permit the valve to approach its seat due not only to the pressure back of the valve but to the spring 50 which insures the closing movement of the valve. The parts, however, are so arranged that the pressure of the spring 50 is not sufficiently great of itself to cause movement of the plate 55 and contract the bellows 52.

In other words—the pressure of the vaporizable fluid in the bellows 52 under normal conditions and due to the large cross section area of the chamber formed thereby will normally counteract the pressure of refrigerant in the chamber 47 and pressure of the spring 50. As the temperature in the refrigerated space, to which this expansion valve is subject, tends to decrease and the valve 44 permitted to move closer to its seat, the amount of fluid being passed per unit of time is reduced and the work that is to be performed by the motor and compressor is also therefore reduced. In fact the exact theoretical condition is one in which very little work is being performed by the motor and compressor as the quantity of fluid to be passed per unit of time is only that required to counteract the tendency of the refrigerated space to increase in temperature through external or other influence.

By this peculiar character of expansion valve I am able to reduce the total consumption of current in that, due to continuous operation and small quantity of fluid transferred per unit of time, the motor may be much smaller and its current consumption therefore correspondingly decreased and I am also able to obviate a waste of current occasioned in previous apparatus of this character in which a material amount of current is consumed in the starting of the apparatus from idle condition. In other words—I have avoided the starting torque and I have also avoided waste of the current through necessity of freeing the expansion side of the system of accumulated pressure arising in the older systems of this character during the idle period of the cycle of operation.

As previously stated, I have also reduced the size of the compressor by provision of a form of compressor permitting a direct connection with the motor shaft running at high speed; therefore the quantity of refrigerant to be transferred by each stroke of the piston is materially reduced. I have also reduced the total cost of the apparatus and have reduced its size and weight permitting the same to be readily handled as a unit and therefore the various objects of this invention are attained, as will be evident from the foregoing, by the embodiment of the invention herein specifically shown and described.

In further explanation of this reduction of size which results from the method of operation heretofore described, it is to be observed that, due to the small quantity of refrigerant handled per unit of time, not only the compressor but the condenser and the expansion coils do not need to be as large as with previous apparatus of this type which must of necessity be considerably larger due to the large amount of work required to be performed in a small amount of time. The operation of the apparatus may be visualized in a sense by considering the operation of a conveyor by which pistons for instance are be transferred. If the conveyor is operated for twenty minutes and remains idle for forty minutes, the idle period is used to load the conveyor. This is analogous to the increase in pressure in the low pressure side during the idle period of the older refrigerating systems of the compressor-condenser-expander type.

To start the conveyor thus loaded with a considerable number of pistons requires an excess amount of power and after starting the conveyor and the load less power is required. This also is analogous to the starting torque and consumption of current under the running condition of the older types of refrigerating systems.

Under my plan of operation the analogous conveyor is operated continuously and the pistons are placed thereon one at a time and the whole work is done over the hour period instead of a twenty minute period. Therefore, the size of the apparatus, not only of the compressor but of the condenser and the expander, may be reduced and the invention practically consists in the method of operating a refrigerating system by passing a refrigerant or heat absorbent element through the chamber to be maintained at constant temperature and varying the volume of flow per unit of time practically in exact relation to the tendency of the atmosphere of the compartment to increase in temperature. The apparatus shown therefore is to be understood as being only one form of refrigerating apparatus by which this principal object of the invention may be attained and any refrigerating apparatus fundamentally arranged and adapted to attain this fundamentally new result is to be understood as being within the spirit and scope of the invention as set forth in the appended claims.

Having thus fully described my invention what I claim is—

An expansion valve providing for restricted flow from the condenser to the expansion coil of an artificial refrigerating system of the compressor-condenser-expander type, said expansion valve comprising a chambered member open to flow from the condenser, a valve member therein and a port opening through the face of the member, an expandible bellows member secured to the member providing a chamber open to the port, said bellows member having a closed end opposite the port including a stem projecting externally thereof, and an internally projecting stem having a portion extending through the port to engagement with the valve, a spring tending to force the valve towards its seat and against the said stem, a conduit opening to the interior of the bellows member and to the expansion coil whereby the position of the valve is effected by the pressure of the refrigerant, a second bellows member supported in longitudinal alignment with the first bellows member and providing a sealed chamber filled with a temperature sensitive fluid, one end of the second bellows member being anchored and the other of which is movable, adjustable means for limiting the extent of movement of the said movable end of the second bellows member by pressure therewithin, said second bellows member being directly subject to temperature change in the space being refrigerated, the outwardly extending stem of the first bellows member being socketed in the said movable end of the second bellows member whereby the expansion of the second bellows member tends to contract the first bellows member and by means of the inwardly projecting stem to hold the valve from its seat to a varied degree depending upon the variation in position of the movable end of the second bellows member.

EARL P. OSWALD.